(12) United States Patent
Hermansen

(10) Patent No.: US 12,087,951 B2
(45) Date of Patent: Sep. 10, 2024

(54) ELECTROCHEMICAL CELL INTEGRATES ELECTROLYSIS AND FUEL CELL FUNCTIONS

(71) Applicant: Peter Hermansen, Watertown, MA (US)

(72) Inventor: Peter Hermansen, Watertown, MA (US)

( * ) Notice: Subject to any disclaimer, the term of this patent is extended or adjusted under 35 U.S.C. 154(b) by 975 days.

(21) Appl. No.: 17/068,023

(22) Filed: Oct. 12, 2020

(65) Prior Publication Data

US 2022/0115673 A1 Apr. 14, 2022

(51) Int. Cl.
| | |
|---|---|
| *H01M 4/90* | (2006.01) |
| *C25B 11/081* | (2021.01) |
| *H01M 8/0656* | (2016.01) |
| *H01M 8/083* | (2016.01) |

(52) U.S. Cl.
CPC ......... *H01M 4/9058* (2013.01); *C25B 11/081* (2021.01); *H01M 8/0656* (2013.01); *H01M 8/083* (2013.01)

(58) Field of Classification Search
CPC .. H01M 4/9058; H01M 4/905; H01M 4/9075; H01M 8/0656; H01M 8/065; H01M 8/083; H01M 8/18; H01M 8/186; C25B 11/081

See application file for complete search history.

(56) References Cited

U.S. PATENT DOCUMENTS

| | | | |
|---|---|---|---|
| 5,292,598 A | 3/1994 | Rosner | |
| 6,908,699 B1 | 6/2005 | Benson | |
| 6,911,273 B2 | 6/2005 | Faris | |
| 7,727,647 B2 | 6/2010 | Eickhoff | |
| 10,358,727 B2 | 7/2019 | Dismukes | |
| 2007/0053046 A1 | 3/2007 | Tench | |
| 2007/0132425 A1 | 6/2007 | Gjini | |
| 2015/0171455 A1 | 6/2015 | Mills | |
| 2015/0240369 A1 | 8/2015 | Jervis | |
| 2017/0005351 A1 | 1/2017 | Rinzler | |

(Continued)

FOREIGN PATENT DOCUMENTS

| | | | | |
|---|---|---|---|---|
| DE | 3532335 A1 | 3/1987 | | |
| DE | 19941261 B4 | 2/2007 | | |
| WO | WO 2012/138576 | * 10/2012 | ............. | H01M 4/86 |

*Primary Examiner* — Raymond Alejandro
(74) *Attorney, Agent, or Firm* — Lambert Shortell & Connaughton; David J. Connaughton, Jr.; Justin P. Tinger

(57) ABSTRACT

An electrochemical cell is provided having an anode, a cathode, and an alkaline electrolyte. The cell is sealed and generates energy via a water-splitting reaction. In accordance with aspects and embodiments, the cathode comprises a surface layer having a first work function and base metal having a second work function. The work function of the surface layer metal is greater than the work function of the base metal. The differences in work functions cause transient charge to travel from the base metal to the surface layer. A double layer of charge forms at the interface of the surface layer and electrolyte that stores energy and drives a water-splitting reaction. Hydrogen gas produced from the water-splitting reaction at the cathode is spontaneously oxidized at the anode, releasing energy, and powering an external load. In some embodiments, the disclosed sealed electrochemical cells may be capable of delivering electrode current densities of 25 mA/cm2 at 0.55V to an external load.

8 Claims, 6 Drawing Sheets

(56) References Cited

U.S. PATENT DOCUMENTS

2017/0301970 A1    10/2017   Antequera Rodríguez
2019/0051907 A1     2/2019   Cui
2020/0040467 A1     2/2020   Rothschild

* cited by examiner

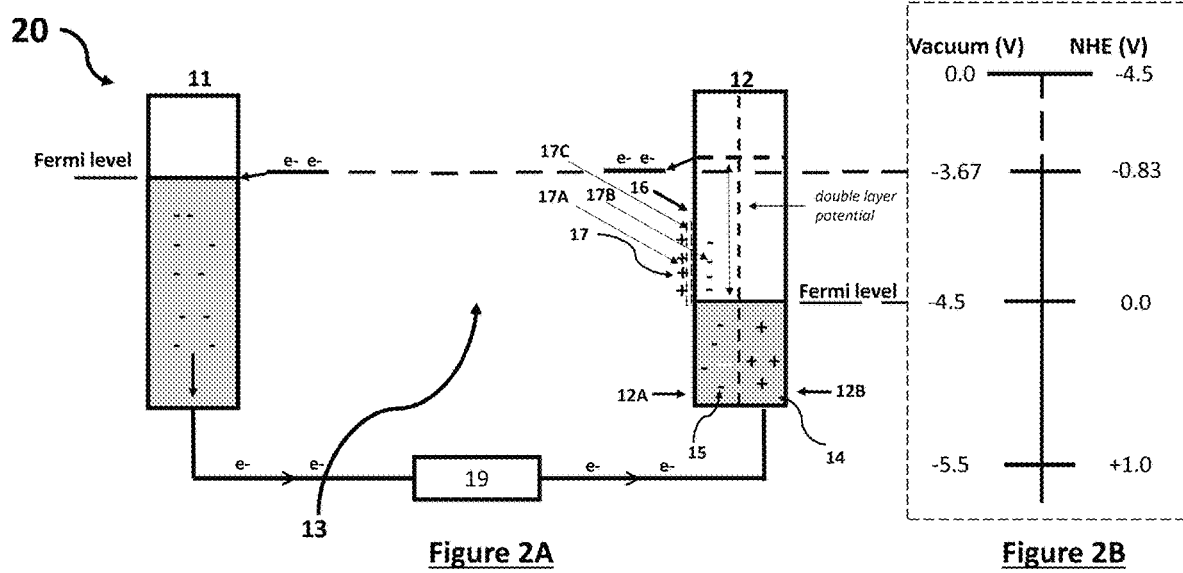

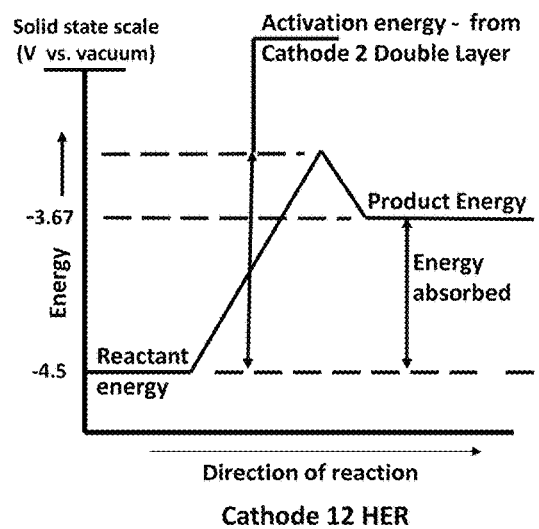 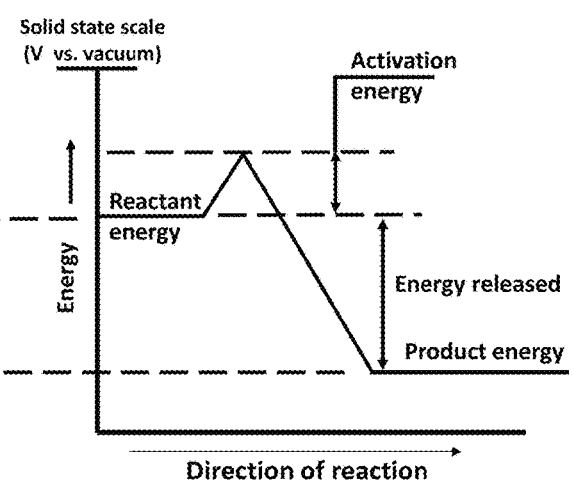
Figure 3A — Cathode 12 HER
Figure 3B — Anode 11 HOR

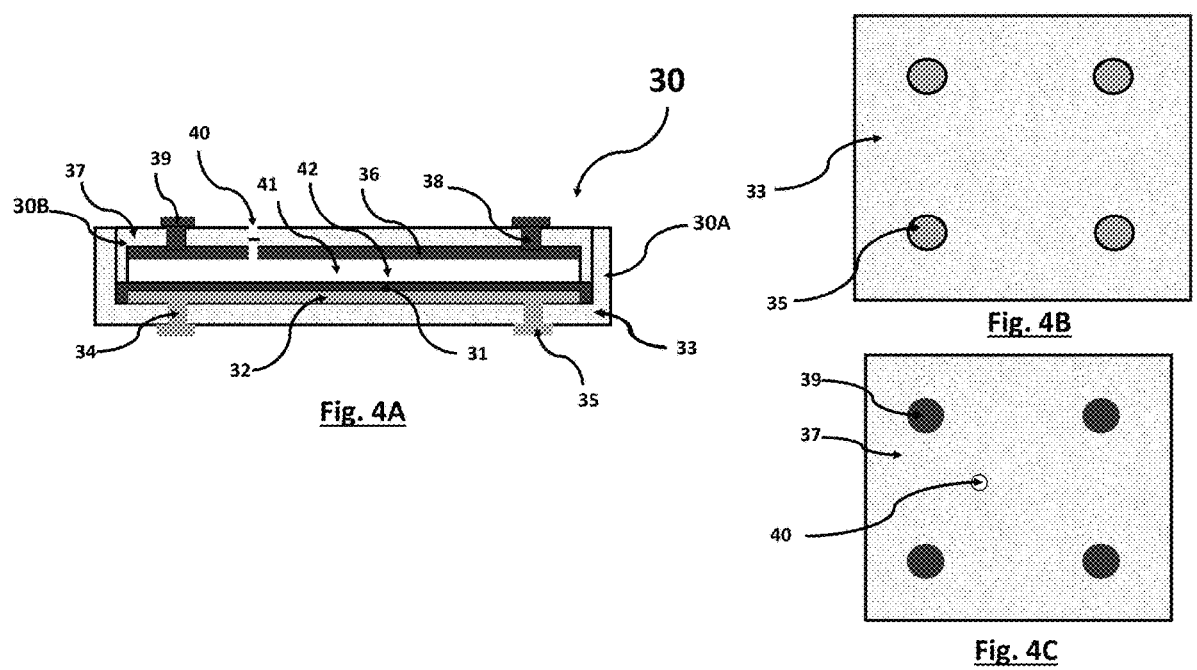

ELECTROCHEMICAL CELL INTEGRATES ELECTROLYSIS AND FUEL CELL FUNCTIONS

FIELD OF DISCLOSURE

The present disclosure relates generally to fuel cells, and more specifically, to a sealed electrochemical cell for powering an external load. In accordance with aspects and embodiments the disclosed electrochemical cell is able to split water to produce hydrogen at one electrode, which is then oxidized by the second electrode, releasing energy that can power an external circuit. The disclosed cells are thus able to provide clean, renewable energy.

BACKGROUND OF THE DISCLOSURE

Energy is required to power nearly every aspect of our daily lives. Electricity powers the lights in our homes, our internet, and the computers in our workspaces, gasoline fuels our cars, and we rely on batteries to keep our cell phones and mobile devices running while on the go. Much the world's energy is obtained through fossil fuels; carbon-dense deposits in the earth that are millions of years old.

Fossil fuels are, globally, the primary source of energy throughout the world. Although these fuels are continually formed by natural processes, fossil fuels are classified as a non-renewable resource because they take millions of years to form. They are consumed at a rate much faster than they are renewed, and giving the ever-increasing demand for energy, there is a finite amount of time for which countries can continue to power themselves on fossil fuels alone. It is estimated, for example, that the United States, if it continues to burn fossil fuels at its current rate, will run out of fossil fuels by the year 2060.

In addition to the limited nature of fossil fuels, fossil fuels contribute to environmental pollution and greenhouse gas emissions. Combustion of fossil fuels produces carbon dioxide, methane, ozone, and other air pollutants, including nitrogen oxides, sulfur dioxide, volatile organic compounds, and heavy metals. Mining of fossil fuels also contributes to environment pollution, including air and water pollution. Air and water pollution can result in damage to ecosystems, acid rain, human health hazards, climate change, and other deleterious effects.

Similar to fossil fuels, lithium ion and traditional alkaline batteries present similar resource obstacles. The elements required to power lithium and alkaline batteries must also be mined, at substantial dollar and environmental cost. In particular, the value of lithium has exponentially increased over the last 30 years due to skyrocketing demand.

The continued demand for traditional alkaline batteries for powering small electronics likewise results in pollution, both from their manufacture and from their improper disposal. When taken to landfills, batteries can release harmful metals, including mercury, lead and cadmium into the environment causing soil contamination and water pollution. The incineration of batteries can also cause air pollution. Battery waste can endanger wildlife and is potentially hazardous to humans.

There thus exists a need for renewable energy sources and sources of energy that are more environmentally friendly. Advances are continually being made in biofuels, as well as hydroelectric, wind, solar, and geothermal technologies. These technologies, however, are limited, and there continues to exist a need for renewable fuel cell technologies able to power loads, including fuel cell technologies that are both able to power small electronics with the potential to be scalable to power automotive vehicles.

An object to the present disclosure is therefore to provide an electrochemical cell able to split water in order to generate hydrogen, which is then oxidized, delivering energy to drive an external circuit. The disclosed cells are self-sufficient, and thus do not need an additional energy input. Moreover, the cells are entirely self-reliant. The disclosed cells may replace standard lithium ion battery packs or other alkaline batteries and advantageously do not require periodic replacement or recharging. The longevity of the disclosed electrochemical cells is limited only by degradation of anodes over time. The disclosed cells advantageously provide a source of clean, renewable, energy in an inexpensive, easily manufactured electrochemical cell. The disclosed cells are advantageously easily constructed and manufactured and use low cost and non-toxic materials.

SUMMARY OF THE DISCLOSURE

The present disclosure advantageously provides a sealed electrochemical cell that does not need to be regenerated, recharged, or replaced. In accordance with aspects and embodiments, a sealed electrochemical cell is provided comprising an anode, an electrolyte, and a cathode. The cathode comprises a first metal and a second metal, where only the first metal contacts the electrolyte. The first metal and the second metal are different metals and the first metal has a higher work function than the second metal. The first metal may be nickel, or a nickel molybdenum alloy and the second metal is aluminum.

The anode has a catalytic metal, which may be nickel or platinum. In some embodiments, the anode may be a plastic substrate having a thin layer of the catalytic metal deposited onto the substrate surface. The electrolyte in the disclosed cells is alkaline, and has a pH of greater than 10, and more preferably, greater than 13. In some embodiments, the electrolyte may be potassium hydroxide or sodium hydroxide in a solvent of de-aerated water.

In accordance with embodiments, an electric field is generated at an interface of the cathode and the electrolyte. Transient charge transfers from the second metal to the first metal causing a negative charge on the surface of the first metal at the interface of the cathode and the electrolyte. The negative charge on the surface of the first metal at the interface of the cathode and the electrolyte causes a layer of positive charge in the electrolyte at the interface of the cathode and the electrolyte. The negative charge on the surface of the first metal and the layer of positive charge in the electrolyte are separated by a layer of polarized water molecules. The negative charge on the surface of the first metal, the layer of positive charge in the electrolyte, the layer of polarized water molecules act as a capacitor and store charge.

The stored charge drives a water-splitting reaction at the cathode surface. This reaction produces hydrogen gas and hydroxide ions. The hydrogen is spontaneously oxidized at the anode. Energy released by the spontaneous oxidation of hydrogen at the anode is less than the energy stored by the negative charge on the surface of the first metal, the layer of positive charge in the electrolyte, and the layer of polarized water molecules acting as a capacitor.

In some embodiments, the anode is positioned inside an anode housing and the cathode is positioned in a cathode housing, and the cathode housing receives the anode housing to space the cathode from the anode and seal in the electrolyte. The disclosed electrochemical cells may have electrode current densities of about 25 mA/cm2, based on calculations for the disclosed exemplary electrode designs.

BRIEF DESCRIPTION OF THE FIGURES

The operation of the disclosure is described below with reference to the accompanying figures.

FIG. 2A shows an electrochemical cell in accordance with aspects and embodiments;

FIG. 2B shows an energy scale of an electrochemical cell in accordance with aspects and embodiments;

FIG. 3A shows a cathode reaction plot, in accordance with aspects and embodiments;

FIG. 3B shows anode reaction plot, in accordance with aspects and embodiments;

FIG. 4A shows an electrochemical cell in accordance with aspects and embodiments;

FIG. 4B shows a bottom view of an electrochemical cell in accordance with aspects and embodiments;

FIG. 4C shows a top view of an electrochemical cell in accordance with aspects and embodiments;

DETAILED DESCRIPTION

In accordance with aspects and embodiments, an electrochemical cell is provided having two electrodes separated by an electrolyte, and more specifically, an anode and a cathode separated by an alkaline electrolyte. The cathode of the disclosed cell comprises two layers, where each layer is a metal, and the first layer metal is dissimilar to the second layer metal. The disclosed electrochemical cell utilizes energy stored in a static electric field generated at the interface of the bilayer cathode and the electrolyte. The cell may be connected to an external load which may, for example, be any device traditionally powered by an AA alkaline battery.

The disclosed electrochemical cells are advantageously sealed and do not require external input of materials, nor do they require periodic recharging. Moreover, because the cell is sealed, the risk of catalyst poisoning from external contaminants is reduced. Additionally, the disclosed electrochemical cells advantageously experience no change in cell entropy because hydrogen generated by the cathode hydrogen evolution reaction (HER) is oxidized at the anode. The potential (+0.83V) required to enable the HER is thus derived from the conventional electrolysis cell thermodynamic potential (+1.23V) rather than from the higher thermo-neutral potential (+1.48V) that must be applied in the case of an electrolysis cell, where the entropy increases due to the two gases (hydrogen and oxygen) that are produced.

Figure 1:
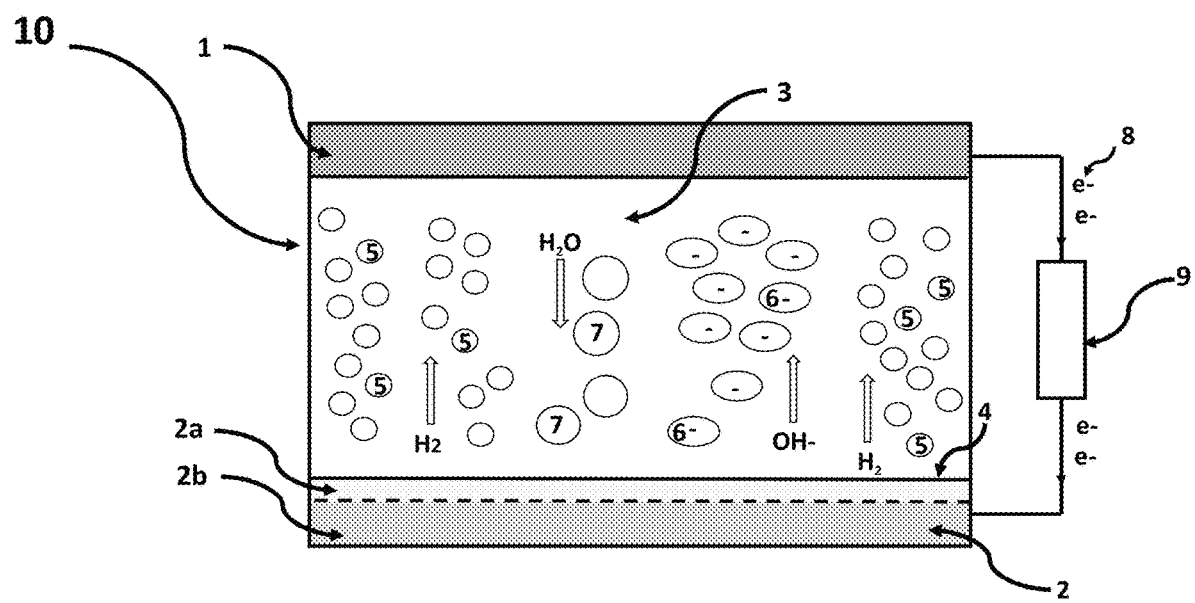
FIG. 1 shows a cross section of an electrochemical cell in accordance with aspects and embodiments depicting flow of reaction products between the anode and cathode and charge flow through an external circuit.

In accordance with aspects and embodiments, cross section of electrochemical cell 10 connected to external load 9 is shown in FIG. 1. Electrochemical cell 10 is sealed. Electrochemical cell 10 has anode 1, bilayer cathode 2, and electrolyte 3. Bilayer cathode 2 has first layer 2a of a first metal and second layer 2b of a second metal. FIG. 1 further shows the flow of reaction products. Energy stored in the static electric field at cathode/electrolyte interface 4 drives a hydrogen evolution reaction (HER). The HER splits water molecules adsorbed on the surface of metal 2a, generating hydrogen gas molecules 5 and hydroxyl ions (OH$^-$) 6. Hydrogen gas molecules 5 and hydroxyl ions 6 diffuse through electrolyte 3 to anode 1, which enables an exothermic hydrogen oxidation reaction (HOR). The HOR reaction recombines hydrogen gas molecules 5 and hydroxyl ions 6 to reproduce water molecules 7. This reaction releases electrons 8, which, driven by the reaction potential, flow through the external load 9 to cathode base metal 2b. Since the HOR is the converse of the HER, no net material product is generated by the overall process, allowing the cell to be sealed.

The chemical process at the surface of cathode 2 is an electrolysis reaction. That is, the double layer electric field drives this non-spontaneous reaction which splits water molecules 7, producing hydrogen gas molecules 5 and hydroxyl ions 6. Conversely, the reaction at anode 1 is an exothermic oxidation reaction, analogous to a traditional fuel cell anode reaction that occurs spontaneously. This reaction results in the release of electrons, i.e., electrical energy, that drives external load 9.

In accordance with aspects and embodiments, the cathode of the disclosed cell has a first layer of metal bonded to a second layer of metal, where only the first layer of metal contacts the electrolyte in the cell. The first layer of metal and second layer, the base layer, of metal of different metals and are selected such that the first layer, i.e., the layer that contacts the electrolyte, has a higher work function than the base layer. The selection of metals having different work functions and arranged such that the metal (or metal alloy) having the higher work function contacts the electrolyte results in the flow of transient current, i.e., electrons, from the base layer to the surface layer. Charge continues to transfer from the base layer to the surface layer until the Fermi levels of the two metals equalize. This can alternatively be thought of as each of the two metals reaching thermodynamic equilibrium.

When equilibrium is achieved, the surface layer metal will have a net negative charge and the base metal will have a net positive charge. At the junction of the two metals, a contact potential is established, preventing further charge transfer. The contact potential is proportional to the difference of the two work functions. The amount of charge that is transferred to the surface layer is a function of the difference in the work functions of the two metals and their relative volumes. As a further result of the charge deficit on the base layer and the charge surplus surface layer, an electrical "double layer" forms at the interface of the surface layer of the cathode and the electrolyte. The double layer comprises two oppositely charged "surfaces". The cathode charged surface consists of a surplus of electrons that are attracted to the positive ions in electrolyte. The charged layer in the electrolyte consists of positive dissolved and solvated ions (cations) that are electrostatically held at the negatively charged electrode surface. The two charged layers are separated by a monolayer of polarized water molecules adsorbed at the surface of surface layer of the cathode. This water monolayer forms an intervening dielectric layer between the charged cathode surface and the charged electrolyte surface. The two charged layers, together with the polarized water monolayer, behave like a capacitor and store charge accordingly. The potential generated by stored charge in the double layer, plus the cathode Fermi level, increases the energy of the cathode negative surface charge enough to enable the transfer of electrons across the electrode/electrolyte interface, thereby reducing water molecules at the cathode surface. That is, the hydrogen evolution reaction (HER), a reduction reaction shown below as equation (1), is driven forward:

$$2H_2O + 2e^- \rightarrow H_2 + 2OH^- \quad (E^0 = -0.83V \text{ vs. NHE}) \quad (1)$$

The reduction potential of the $H_2O/H_2$ reduction is $-0.83$ eV with respect to a normal hydrogen electrode (NHE) reference electrode having a potential of 0V. It will be appreciated that calculating potentials using standard reference electrodes is a well understood practice known to those of skill in the art. As discussed, the HER reaction is not therefore spontaneous and must be driven forward, and the cathode surface charge potential must be increased by at least +0.83V (with respect to the NHE 0V potential) to enable a transfer of electrons from the cathode to the adsorbed water molecules to facilitate the HER reaction. However, in accordance with aspects and embodiments, the double layer capacitance is able to charge to a potential of 1.0V or more in order to produce a reaction rate that is able to generate a current sufficient to power an external load.

The products of the HER reaction, hydrogen gas ($H_2$) and hydroxyl ions ($OH^-$) diffuse through the electrolyte to the anode. The hydroxyl ions, which carry a negative charge, transport the cell current. The anode serves as the catalyst for the spontaneous hydrogen oxidation reaction (HOR):

$$H_2 + 2OH^- \rightarrow 2H_2O + 2e^- \quad (2)$$

In this reaction hydrogen is oxidized. The potential of this half-reaction is therefore negative of the HER standard reduction potential:

$$E_{anode} = -E_{(H2O/H2)} = -(-0.83V) = +0.83V \quad (3)$$

Since the cathode double layer energy input enables the non-spontaneous HER, the net cell potential is therefore:

$$E^0{}_{cell} = E_{anode} + E_{cathode} = +0.83V + 0V = +0.83V \quad (4)$$

The double layer capacitance can be calculated from the separation of the charged layers, the surface area, and the relative permittivity of the water solvent. This value can in turn be used to determine the amount of electrode surface charge that is required to reach a desired double layer potential. When, for example, water is used as a solvent, the relative permittivity (k) is about 6 in the presence of a strong electric field. The separation of the two charged layers is approximately 0.3 nm., or $3 \times 10^{-10}$ m., and the permittivity of space, Co, is $8.854 \times 10^{-12}$ F/m. The capacitance of the double layer, per $cm^2$ is thus:

$$C = k\varepsilon_0 A/d = 6 \times 8.854 \times 10^{-12} \times 1 \times 10^{-4}/3 \times 10^{-10} \quad (5)$$

$$C = 18 \text{ uF/cm}^2 \quad (6)$$

This, however, is the differential capacitance of a smooth electrode surface. In a water electrolysis cell, the surface area is micro roughened or otherwise modified to increase the real surface area with respect to the geometric area, usually by several orders of magnitude. This increases the double layer capacitance. Assuming, for example, that the real area of the electrode is 100 times the geometric area, the double layer charge/$cm^2$ required to achieve a potential of 1V would be:

$$Q = CV = (1800 \times 10^{-6} \text{ F/cm}^2) \times 1V = 1.8 \times 10^{-3} \text{ coulomb/cm}^2 \quad (7)$$

Since 1 coulomb is equivalent to the total charge of $6.24 \times 10^{18}$ electrons, this corresponds to a total number of electrons/$cm^2$ in the cathode surface charge layer of:

$$\text{No. of electrons/cm}^2 = 1.8 \times 10^{-3} \times 6.24 \times 10^{18} = 1.12 \times 10^{16}/cm^2 \quad (8)$$

The required charge transfer rate at the cathode/electrolyte interface is then determined by the cathode surface charge density (8) and the cell current. In accordance with aspects and embodiments, the cell current density may be 0.025 A/$cm^2$. At a current density of 0.025 A/$cm^2$, the required charge transfer rate is:

$$\text{No. electrons/cm}^2\text{-sec} = 0.025 \times 6.24 \times 10^{18} = 1.56 \times 10^{17}/cm^2\text{-sec} \quad (9)$$

Therefore the cathode must transfer the charge given by (8) across the electrode/electrolyte interface about 14 times per second in order to support a cell current density of 0.025 A/$cm^2$, assuming a 1V double layer potential.

Adsorbed water molecules are reduced on the cathode surface, producing hydrogen molecules and hydroxyl ions, according to equation (1) when the electron potential exceeds the $H_2O/H_2$ reduction potential, located 0.83 eV above the $H+/H_2$ reduction potential (0 eV vs. NHE). In accordance with aspects and embodiments, the two cathode metals and their relative volumes are selected to produce a cathode Fermi level that is about $-4.5$ eV below the vacuum level (equivalent to 0 eV vs. NHE), so that a double layer potential of +0.83 eV plus the 0 eV cathode Fermi level generates enough energy to enable the HER. The required overpotential to generate a sufficient reaction rate is a function of the cell current density. Because the hydrogen generated by the cathode HER is oxidized at the anode, there is no net change in the cell entropy, so the potential (+0.83V) required to enable the HER is derived from the conventional electrolysis cell thermodynamic potential (+1.23V) rather than from the higher thermo-neutral potential (+1.48V) that must be applied in the case of an electrolysis cell, where the entropy increases due to the production of oxygen gas in addition to hydrogen gas.

The cathode overpotential as a function of cell current can be determined using the Tafel equation:

$$E_{act(cath)} = b \times \log(j/j'_0) \quad (10)$$

where:
b=Tafel slope (mV/decade). It is a property of the electrode surface. Since the y-axis of the Tafel plot is the overpotential and the x-axis is the log of the current density, a small slope is desired in order to minimize increase in the overpotential with increasing current density.
j=cell current density (mA/$cm^2$)
$j'_0$=exchange current density on a smooth electrode surface (mA/$cm^2$). It is a property of the electrode material; good electrocatalysts have the highest exchange current densities.

The HER exchange current density, $j'_0$, on a smooth nickel surface in alkaline solutions is, for example, about $10^{-2}$ mA/$cm^2$. The Tafel slope is about 120 mV/decade under standard conditions, so the cathode overpotential at a current density of 25 mA/$cm^2$ is:

$$E_{act(cath)} = 0.12 \times \log(25/10^{-2}) = 0.41V. \quad (11)$$

As discussed, there is a need for a high electrode surface area to maximize the number of reaction sites. This results in an actual surface area that can be several orders of magnitude greater than the smooth (geometric) electrode area. The effective exchange current density of such a surface is related to the exchange current density of a smooth electrode surface by:

$$j_0 = j'_0 (A/A') \quad (12)$$

where:
A=actual electrode surface area
A'=geometric (smooth) electrode surface area Assuming that, from micro-roughening, the cathode has a surface area of 100 times its geometric area, then $j_0=100 \times j'_0$. Using a current density of 25 mA/cm², the overpotential is:

$$E_{act(cath)} = 0.12 \times \log(25/100 \times 10^{-2}) = 0.17V. \quad (13)$$

Since the cathode Fermi level lies at about 0.83 eV below the $H_2O/H_2$ half-reaction, the minimum double layer potential required to drive the HER at a cell current density of 25 mA/cm² is:

$$E_{double\ layer} = -E_{(H2O/H2)} + E_{act(cath)} \quad (14)$$

where:
$E_{(H2O/H2)}$ is the $H_2O/H_2$ half-cell reduction reaction potential, which is −0.83 eV vs. NHE.
$E_{act(cath)}$ is the cathode activation overpotential.
Therefore:

$$E_{double\ layer} = 0.83\ eV + 0.17\ eV = 1.0\ eV \quad (15)$$

This is the double layer potential that is required to enable a HER that can support a 25 mA cell current density in the disclosed cell. The spontaneous anode HOR converts the HER products back to water, releasing the electrons, which flow back to the cathode through the external load, thereby closing the cell current loop.

The electrolyte transports the HER products, $H_2$ and $OH^-$, from the cathode to the anode via diffusion. The HOR product, $H_2O$, is returned to the electrolyte, replacing the water molecules that were reduced at the cathode. Since only one gas, $H_2$, is produced by the cell, there is no need for the ion-permeable separator used in electrolysis and fuel cells to prevent the formation of $H_2/O_2$ gas mixtures. However, a porous membrane or matrix that is saturated with the alkaline electrolyte could be an ideal way to introduce the electrolyte into the cavity between the closely spaced electrodes.

The anode consists of a thin (possibly less than 100 nm) layer of metal deposited on a plastic substrate, connected to the cathode through an external load. The anode surface is roughened or applied as nanoparticles to maximize the available reaction area. The anode is analogous to a fuel cell anode; the metal is a catalyst for the exothermic HOR. Hydrogen molecules transported through the electrolyte are dissociatively adsorbed as atoms at vacant sites on the anode surface. The atoms ionize, bonding with adsorbed $OH^-$ ions to produce water molecules, replacing those that were reduced at the cathode. With the release of electrons to the anode, current flows through the external load to the cathode base layer.

The influx of electrons to the anode from the HOR raises its Fermi level to the $H_2O/H_2$ half-reaction potential, located 0.83 eV above the cathode Fermi level. The load voltage is therefore equal to +0.83V, minus the voltage drops due to the cell resistances: the anode overpotential resistance, the anode and cathode electrode resistances, and the electrolyte resistance.

In an alkaline fuel cell (AFC), the measured open circuit voltage is about 0.2V less than the theoretical cell voltage of 1.23V, due to gas crossover losses caused by leakage of hydrogen from the anode (where it is pumped into the fuel cell) through the electrolyte to the cathode. In disclosed cell however, hydrogen is generated in situ at the cathode via the HER and diffuses through the electrolyte to the anode surface so there is no loss of potential due to hydrogen bypassing the electrochemical circuit. Therefore, the cell open circuit voltage is equal to the anode open circuit voltage, which is +0.83V.

The cell voltage as a function of output current is then:

$$E_{elec(cell)} = E_{anode} - E_{act(anode)} - IR_{anode} - IR_{cath} - IR_{ionic} \quad (16)$$

where:
$E_{elec(cell)}$ is the cell output voltage at current I.
$E_{anode}$ is the anode open circuit voltage (+0.83V).
$E_{act(anode)}$ is the anode activation overpotential.
$R_{anode}$ is the anode resistance.
$R_{cath}$ is the cathode resistance.
$R_{ionic}$ is the electrolyte resistance.

As with the cathode activation overpotential, the anode activation overpotential can be determined by means of the Tafel equation:

$$E_{act(anode)} = b \times \log(j/j'_0) \quad (17)$$

where:
b=Tafel slope (mV/decade). It is a property of the electrode material and provides information on the HOR rate determining step. Since the y-axis of the Tafel plot is the overpotential and the x-axis is the log of the current density, a small slope is desired, in order to minimize increase in the overpotential with increasing current density.
j=current density (mA/cm²)
$j'_0$=exchange current density on a smooth electrode surface (mA/cm²).

Assuming that, like the cathode, the anode has a surface area of 100 times its geometric area, the exchange current density of this surface is related to the exchange current density of a smooth surface by:

$$j_0 = j'_0 (A/A') = 100 j'_0 \quad (18)$$

where:
A=actual surface area of a working electrode
A'=geometric (smooth) area of an electrode The HOR exchange current density, $j'_0$, on a smooth nickel surface in alkaline solutions, for example, is about $2 \times 10^{-3}$ mA/cm². The Tafel slope is typically 120 mV/decade under standard conditions. The overpotential, at a current density of 25 mA/cm² is then:

$$E_{act(anode)} = 0.12 \times \log(25/200 \times 10^{-3}) = 0.25V. \quad (19)$$

The total voltage drop due to the anode, cathode, and electrolyte resistances will be about an order of magnitude less than the activation overpotential of the nickel anode, so they can be assumed to total about 0.03V.

At current density I=25 mA/cm², under standard conditions, the cell potential is then:

$$E_{elec(cell)} = 0.83V - 0.25V - 0.03V = 0.55V \quad (20)$$

Referring back to equation (15), the double layer then has to charge to a potential of 1.0V in order to deliver 0.55V across the load at a current density of 25 mA/cm². Thus, the disclosed cell may have an output voltage of 0.55V at a current density of 25 mA/cm².

FIG. 2A provides an electrochemical cell 20 in accordance with aspects and embodiments. Anode 11 and cathode 12 are separated by alkaline electrolyte 13. Cathode 12 comprises two dissimilar metals 12A and 12B. The surface layer 12A consists of an HER catalyst metal having a first work function deposited onto a metal base layer 12B having a second work function different from the first work function, where the work function of the HER catalyst metal 12A is greater than the work function of the metal base layer 12B. Metal 12A may be nickel and metal 12B may be aluminum. Only surface layer 12A contacts electrolyte 13. Metal 12A is selected to have a higher work function than metal 12B such that a transient current transfers charge from the base layer to the surface layer. Charge transfers until the Fermi levels of the two metals equalize. The ratio of the base layer volume to the surface layer volume is selected to achieve the desired equilibrium level.

An electrical double layer 17 forms at cathode/electrolyte interface 16 comprising two oppositely charged surfaces 17A and 17B. The cathode charge surface at 17B at 12A consists of surplus electrons attracted to the positive ions in electrolyte 13, while electrolyte layer 17A consists of positive dissolved and solvated cations electrostatically held at the negatively charged cathode surface. Layers 17A and 17B are separated by a polarized water molecule monolayer 17C adsorbed at the surface of cathode 12A.

FIG. 2B provides an energy scale showing the equilibrium Fermi level reached when the exemplary metals of nickel (which has work function of 5.1 eV) and aluminum (having a work function 4.3 eV) are selected for the surface layer 12A and base layer 12B of cathode 12, respectively. The equilibrium Fermi level is about 4.5 eV below the 0 eV level on the vacuum, or absolute, scale, corresponding to 0V on the electrochemical, or normal hydrogen electrode (NHE) scale. FIGS. 3A and 3B provide reaction plots of the half-cell reactions that take place at cathode 12 and anode 11 in cell 20, when cathode 12 comprises base layer 12B of aluminum and surface layer 12A of nickel. FIG. 3A shows the reaction plot of the HER at cathode 12 and FIG. 3B shows the reaction plot of the HOR at anode 11.

Suitable metals for use as anodes in the disclosed electrochemical cells include, but are not limited to, nickel and platinum. In some embodiments, the anode may be a thin layer of a suitable metal deposited on a plastic substrate. In a preferred embodiment, the anode may be a thin layer of nickel having a thickness of about 100 nm or less on a plastic substrate.

Hydrogen molecules are dissociatively adsorbed as atoms via catalytic action at the anode surface. The atoms are ionized, and electrons flow through the external load to the cathode base layer, completing the cell current loop. Because the anode is the equivalent of a fuel cell anode, the load voltage is equal to the +0.83V anode potential, minus the cell polarization losses, which include the anode overpotential and the electrode and electrolyte resistive losses. The hydrogen and hydroxyl ions bond to form water molecules, replacing the ones that were split at the cathode.

The electrons flowing into the positively charged cathode base layer increase the Fermi level, while reduction current flowing out of the cathode surface layer decreases the surface layer Fermi level. The resulting energy gradient produces a current flow that transfers electrons from the base layer to the surface layer. In this way, the level of surplus charge in the surface layer is maintained constant and the double layer continues to charge to the potential that is required to support the cathodic reduction current dictated by the load impedance.

Only the cathode surface layer, which has the surplus charge, contacts with the electrolyte, and is the surface on which the HER occurs. In accordance with aspects and embodiments, the metal selected for the cathode surface layer must be selected to have a higher work function than the cathode base metal to enable charge transfer from the base layer to the surface layer. The metal must also be an active HER electrocatalyst that is able to withstand the corrosive effects of a strong alkaline electrolyte. Moreover, the selected metal must also be a good electrical conductor. In addition to these properties, metals selected for the cathode surface layer should also be readily available and not cost-prohibitive.

In accordance with aspects and embodiments, nickel may be selected for the surface layer of the cathode. Nickel has a work function 5.1 eV and can be bonded with lower work function metals, including aluminum, which has a work function of 4.28 eV, to achieve a target electrode Fermi level that is about 4.5 eV below the vacuum level on the solid state scale. In some embodiments, nickel may be combined with a second metal, a third metal, or any combination of metals, to improve performance. For example, nickel may be combined with Molybdenum (Mo) in a Ni—Mo alloy for the surface layer cathode. Other metals, including transitional metals, metal alloys, and transition metal alloys, will be readily selected for use in the surface layer cathode by those of skill in the art.

In accordance with aspects and embodiments, the electrolyte is selected to enable electrochemical reactions at the cathode and anode, that is, to enable HER and HOR reactions, respectively. Accordingly, suitable electrolytes will have high ionic conductivity and should be selected to provide a high concentration of solvated cations at the cathode/electrolyte boundary to maximize the double layer potential, thereby facilitating the HER. In some embodiments, the electrolyte may be a strong base, and may, for example, have a pH over 10, and more preferably, have a pH of 14. In these embodiments, the electrolyte may be one of sodium hydroxide (NaOH) or potassium hydroxide (KOH) solution, where the solvent is water. The water may, in some embodiments, be de-aerated water. De-aerated water may be selected as the electrolyte solvent to minimize secondary reactions, for example, secondary oxygen reactions. The selection of de-aerated water also promotes the dissolution of hydrogen bubbles at the cathode surface to hydrated form in the electrolyte, which further facilitates the oxidation of hydrogen (the HOR reaction) at the anode surface.

Figure 5B:
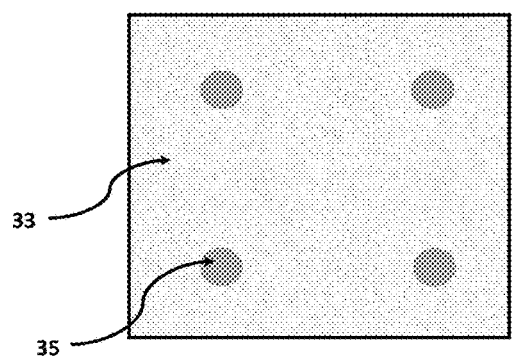
FIG. 5B shows a bottom view of a cathode assembly of an electrochemical cell in accordance with aspects and embodiments.
Figure 5C:
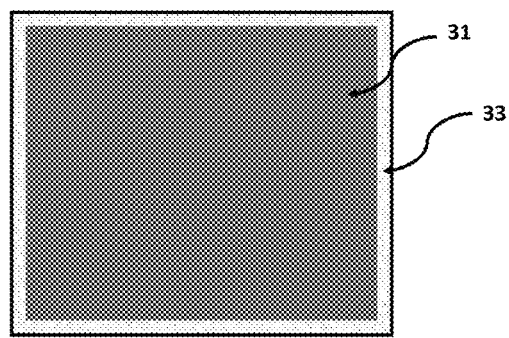
FIG. 5C shows a top view of a cathode assembly of an electrochemical cell in accordance with aspects and embodiments.
Figure 5A:
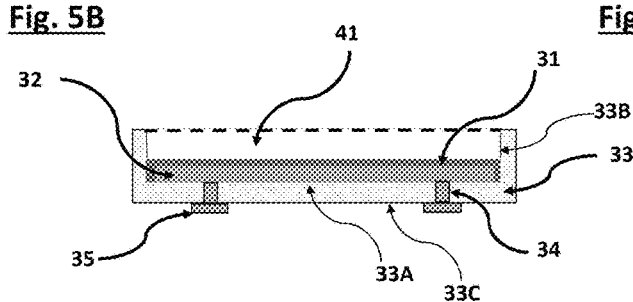
FIG. 5A shows a cathode assembly of an electrochemical cell in accordance with aspects and embodiments.
Figure 6B:
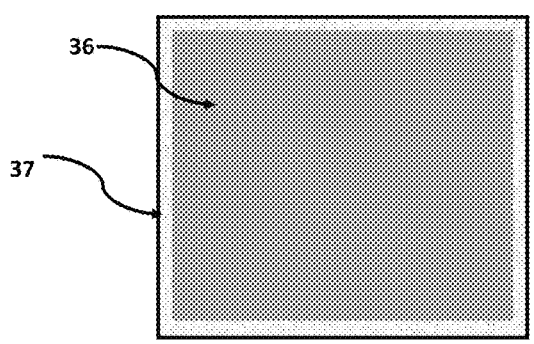
FIG. 6B shows a bottom view of an anode assembly of an electrochemical cell in accordance with aspects and embodiments.
Figure 6C:
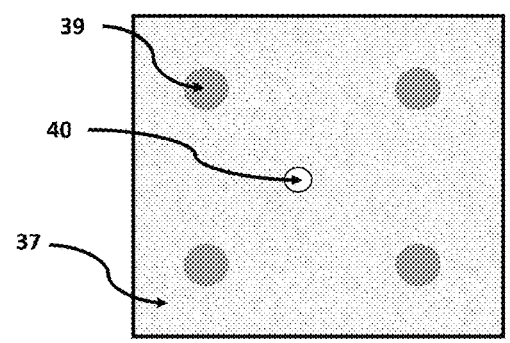
FIG. 6C shows a top view of an anode assembly of an electrochemical cell in accordance with aspects and embodiments.
Figure 6A:
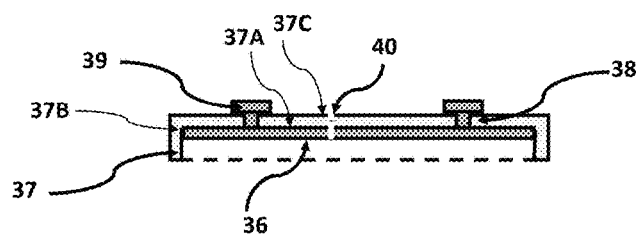
FIG. 6A shows an anode assembly of an electrochemical cell in accordance with aspects and embodiments.

In accordance with aspects and embodiments, electrochemical cell 30 is provided in FIGS. 4A-4C. Electrochemical cell 30 has anode assembly 30B and cathode assembly 30A. Anode case 37 of assembly 30B is positioned within cathode case 33 of assembly 30A, sealing in electrolyte 42. Referring also to FIGS. 5A-5C showing cathode assembly 30A and FIGS. 6A-6C showing anode assembly 30B, the top of the anode case 37 rests on cathode surface metal 31. The height of anode case wall 37B with respect to the anode metal surface 36 establishes the spacing between the cathode and anode of cell 30. This space is filled with electrolyte 42.

Referring to FIGS. 5A-5C, cathode base metal 32 is preferably deposited on the inside surface 33A of case 33 via vacuum deposition. Depositing of base metal 32 does not extend to the inner side walls 33B of case 33. Connection to an external load (not shown) is made by contacts to base metal 32 via holes 34 in the bottom surface 33C of case 33 that that are plated with base metal 32. Plated holes 34 connect to metal contacts 35 which serve as cathode connection points.

Cathode surface metal 31 is deposited over cathode base metal 32 and extends over the entire inside of case 33.

Surface metal 31 completely covers base metal layer 32 and fills the gap between base metal 32 and internal side walls 33A of case 33, ensuring that base layer 32 is not exposed to electrolyte 42. This ensures that base metal 2 is protected from the corrosive forces of electrolyte 42.

Referring to FIGS. 6A-6C, anode metal 36 is deposited on the inside surface 37A of case 37, preferably via vacuum disposition. Connection to an external load (not shown) is made by contacts to anode metal 36 via holes 38 in the bottom surface 37C of case 37 that that are plated with base metal 36. Plated holes 38 connect to metal contacts 39 which serve as anode connection points. A valve 40 is located in anode case 36, which extends through bottom surface 37C, inside surface 37A, and base metal 36. Valve 40 enables excess electrolyte to escape once the anode assembly is inserted into the cathode assembly.

Referring back to FIG. 4A, electrolyte 42 is applied to the cathode well 41. Cathode well 41 is formed by internal side walls 33A of cathode case 33 and cathode surface metal 31. Electrolyte 42 is applied to well 41 in a pre-measured amount to fill the volume of the well between the two electrodes when anode assembly 30B is inserted into cathode assembly 30A to form cell 30, as shown in FIG. 4. In some embodiments, electrolyte 42 may be instead inserted into the cell by a porous separator or matrix saturated with electrolyte that fills the space between anode and cathode. The separator or matrix material would have to be sufficiently porous to permit the diffusion of reaction products between the electrodes.

While various embodiments of the present disclosure have been described above, it should be understood that they have been presented by way of example only, and not by way of limitation. It will be apparent to a person skilled in the relevant art that various changes in form and detail may be made therein without departing from the spirit and scope of the disclosure. Thus, the present disclosure should not be limited by any of the above described exemplary embodiments.

What is claimed is:

1. A circuit comprising an electrochemical cell, the circuit comprising:
   a sealed electrochemical cell having an anode, an electrolyte, and a cathode comprising a first metal and a second metal, where only the first metal contacts the electrolyte;
   a load in electrical communication with the anode and the second metal of the cathode;
   wherein the first metal and the second metal are different metals;
   wherein the first metal has a higher work function than the second metal;
   wherein the first metal is a HER catalyst, wherein the HER catalyst comprises nickel;
   wherein the second metal is aluminum;
   wherein the anode comprises an HOR catalytic metal, wherein the HOR catalytic metal is nickel;
   wherein a metal is deposited onto a plastic substrate;
   wherein the electrolyte is potassium hydroxide in solvent;
   wherein an electric field is generated at an interface of the cathode and the electrolyte;
   wherein a transient charge transfers from the second metal to the first metal causing a negative charge on the surface of the first metal at the interface of the cathode and the electrolyte; and
   wherein the negative charge on the surface of the first metal at the interface of the cathode and the electrolyte causes a layer of positive charge in the electrolyte at the interface of the cathode and the electrolyte.

2. The electrochemical cell of claim 1, wherein the electrolyte is an alkali metal hydroxide dissolved in water.

3. The electrochemical cell of claim 1, wherein the negative charge on the surface of the first metal and the layer of positive charge in the electrolyte are separated by a layer of polarized water molecules, and the negative charge on the surface of the first metal, the layer of positive charge in the electrolyte, the layer of polarized water molecules act as a capacitor and store charge.

4. The electrochemical cell of claim 3, wherein the electric field generated by the stored charge drives a water-splitting reaction at the cathode surface that produces hydrogen gas and hydroxide ions.

5. The electrochemical cell of claim 4, wherein hydrogen gas is spontaneously oxidized at the anode to produce water, thereby replacing water that was reduced at the cathode.

6. The electrochemical cell of claim 5, wherein energy released by the spontaneous oxidation of hydrogen at the anode is less than the energy stored by the negative charge on the surface of the first metal, the layer of positive charge in the electrolyte, and the layer of polarized water molecules acting as a capacitor.

7. The electrochemical cell of claim 6, wherein the anode is positioned inside an anode housing and the cathode is positioned in a cathode housing, and the cathode housing receives the anode housing to space the cathode from the anode and seal in the electrolyte.

8. The electrochemical cell of claim 7, wherein the cell output voltage is 0.55V at a current density of 25 mA/cm$^2$.

* * * * *